United States Patent
Mayer

(10) Patent No.: US 7,042,908 B1
(45) Date of Patent: May 9, 2006

(54) METHOD AND APPARATUS FOR TRANSMITTING ARBITRARY ELECTRICAL SIGNALS OVER A DATA NETWORK

(75) Inventor: Michael G. Mayer, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 549 days.

(21) Appl. No.: 09/613,418

(22) Filed: Jul. 10, 2000

(51) Int. Cl.
H04J 3/06 (2006.01)
H04L 7/00 (2006.01)

(52) U.S. Cl. ...................................... 370/503; 375/371
(58) Field of Classification Search ............... 370/503, 370/505, 506, 516; 375/354, 371, 372, 375
See application file for complete search history.

(56) References Cited

U.S. PATENT DOCUMENTS

| | | | | | |
|---|---|---|---|---|---|
| 4,488,294 | A | * | 12/1984 | Christensen et al. | 370/545 |
| 5,111,485 | A | * | 5/1992 | Serack | 375/363 |
| 5,150,386 | A | * | 9/1992 | Stern et al. | 375/371 |
| 5,256,912 | A | * | 10/1993 | Rios | 327/144 |
| 5,287,360 | A | * | 2/1994 | Regent | 370/506 |
| 5,351,271 | A | * | 9/1994 | Coquerel | 375/224 |
| 5,471,511 | A | * | 11/1995 | De Langhe et al. | 375/376 |
| 5,563,891 | A | * | 10/1996 | Wang | 370/505 |
| 5,828,670 | A | * | 10/1998 | Narasimha et al. | 370/516 |
| 5,933,432 | A | * | 8/1999 | Ha et al. | 370/505 |
| 6,169,772 | B1 | * | 1/2001 | Fourcroy | 375/354 |
| 6,229,863 | B1 | * | 5/2001 | Rude | 375/372 |
| 6,259,677 | B1 | * | 7/2001 | Jain | 370/252 |
| 6,385,267 | B1 | * | 5/2002 | Bowen et al. | 375/376 |
| 6,415,008 | B1 | * | 7/2002 | Bechade et al. | 375/376 |
| 6,628,214 | B1 | * | 9/2003 | Kawase et al. | 341/100 |
| 6,658,074 | B1 | * | 12/2003 | Murakami | 375/372 |
| 6,711,228 | B1 | * | 3/2004 | Kato et al. | 375/376 |
| 6,754,235 | B1 | * | 6/2004 | Van Der Putten et al. | 370/503 |
| 6,832,046 | B1 | * | 12/2004 | Thomas | 398/72 |
| 2002/0114354 | A1 | * | 8/2002 | Sinha et al. | 370/503 |

* cited by examiner

Primary Examiner—Hassan Kizou
Assistant Examiner—Gregory Sefcheck
(74) Attorney, Agent, or Firm—Jeffrey M. Measures; Borden Ladner Gervais LLP

(57) ABSTRACT

The present invention relates to a method and apparatus for transmitting an electrical digital signal of arbitrary transmission rate over a data network characterized by a range of allowable transmission rates, where the data network may be synchronous or asynchronous, optical or electrical. A synchronizer is provided for mapping an incoming electrical digital signal into a frame for transmission over the optical network. The line transmission rate of the frame is recovered from the data clock signal of the incoming digital signal, independent of the format and bit-rate of the data network. A desynchronizer is also provided for reverse mapping a data signal, received over the data network, into an electrical digital signal of arbitrary transmission rate.

14 Claims, 4 Drawing Sheets

METHOD AND APPARATUS FOR TRANSMITTING ARBITRARY ELECTRICAL SIGNALS OVER A DATA NETWORK

FIELD OF THE INVENTION

The present invention relates to the field of data transmission, such as data transmission that may occur in a data network that can be synchronous or asynchronous. More particularly, it pertains to a method and apparatus for transporting data signals of arbitrary transmission rate over a data network characterized by a range of allowable transmission rates.

BACKGROUND OF THE INVENTION

Evolution of the current data transport networks is hindered by a number of constraints. For example, the optical transport networks operate according to fiber specific transmission protocols, each having different levels of operation, administration, maintenance and provisioning (OAM&P) functionality, so that the nodes must be equipped with protocol-specific hardware and software. In addition, handling a plurality of protocols at speeds over 100 Mb/s poses real problems for the current generation of microprocessors.

One way to increase the speed (and bandwidth) of the network is to replace the electronics components with optical components. The increased transport capacity requirements are also met by the introduction of point to point optical fiber systems, carrying TDM signals. An example of a TDM network is SONET/SDH, which transports hierarchically multiplexed lower rate tributaries into a higher rate TDM signal. SONET/SDH is a physical layer technology which is currently used as a transport service for ATM, SMDS, frame relay, T1, E1, etc. SONET/SDH provides the ability to combine and consolidate traffic from different locations through one facility (grooming) and reduces the amount of back-to-back multiplexing. More importantly, network providers can reduce the operation cost of their transmission network by using the comprehensive OAM&P features of SONET.

Originally, optical transport networks were intended to be bit-rate and data format independent, thus providing for the transportation of a wide variety of data signals. Unfortunately, current, optical transport networks, including SONET/SDH networks, do not achieve this goal, as the line rates for these networks have been restricted to a set of discrete transmission rates. Similarly, current electrical transport networks, such as the DS3 electrical network, are also limited to particular, discrete transmission rates. Thus, data characterized by a transmission rate that does not belong to the set of pre-defined transmission rates is not directly transportable over such data networks. In many cases, a user signal must undergo a mapping operation to be able to be transported by the data network.

The mapping of one rate or format into another is well known. For example, Bellcore TR-0253 describes in detail the standard mappings of the common asynchronous transmission formats (DS0, DS1, DS2 and DS3, among others) into SONET. Similar mappings are defined for the ETSI hierarchy mapping into SDH.

Unfortunately, the standards or proprietary schemes allow the transportation of only a very specific set of signals, with format specific hardware. Thus, these methods of mapping cannot be used to map rates that vary significantly from the standard. Furthermore, these mappings are each precisely tuned for a particular format and a particular bit-rate, with for example a ±20 ppm (parts per million of the bit rate) tolerance. If a signal has, for example, a bit rate even 1% different than that of a DS3, it cannot be transported over a SONET/SDH network. In addition, a different hardware unit is generally required to perform the mapping of each kind of signal.

In a somewhat different approach discussed in the U.S. patent application Ser. No. 09/349,087 (Roberts), entitled "Mapping Arbitrary Signals into SONET", filed on Jul. 8, 1999 and assigned to Nortel Networks Limited, arbitrary electrical signals are converted into SONET optical signals by using a synchronizer. The synchronizer maps the arbitrary electrical signals into SONET signals such that the electrical signals can be recovered with low timing jitter at low cost at the far end. This mapping method can be used for tributaries of almost any continuous format. The synchronizer recognizes selected protocols, frames on them, and effects the corresponding performance monitoring.

Also, U.S. patent application Ser. No. 09/438,516 (Roberts et al.), entitled "Detection of Previous Section Fail for a Transparent Tributary", filed on Nov. 12, 1999 and assigned to Nortel Networks Limited, discloses a method and apparatus for transmitting a continuous digital signal of an arbitrary rate R1 over a synchronous network as a transparent tributary. The rate R1 of the continuous digital signal is detected and a protocol corresponding to the rate R1 is determined, according to which protocol a set of performance parameters on the continuous digital signal are measured and reported.

The background information provided above indicates that there is a need in the industry to improve the technology for transparently transmitting electrical data signals, in particular signals of arbitrary transmission rate, over a data network.

SUMMARY OF THE INVENTION

The present invention provides in a first broad aspect a synchronizer for mapping an electrical digital signal of arbitrary transmission rate for transport over a data network characterized by a range of allowable transmission rates. The data network can be an optical network or an electrical network. Also, the network may be a synchronous network or an asynchronous network. The synchronizer includes a data recovery unit, a clock generator unit and a mapping unit. The data recovery unit receives the electrical digital signal and recovers therefrom a stream of data bits and a first data clock signal indicative of the arbitrary transmission rate. The clock generator processes the first data clock signal for generating a second data clock signal indicative of a line transmission rate that falls within the range of allowable transmission rates for the data network. The mapping unit uses the first and the second data clock signals to map the stream of data bits into a frame for transmission over the data network.

According to a second broad aspect of the invention, there is provided a desynchronizer for reverse mapping a frame received over a data network into an electrical digital signal having an arbitrary transmission rate. The desynchronizer includes a clock recovery unit, a reverse mapping unit and a data transmitter unit. The clock recovery unit receives the frame and recovers therefrom a data clock signal indicative of a line transmission rate. The reverse mapping unit extracts from the frame a stream of data bits according to a reverse mapping algorithm, on the basis of the line transmission rate. The data transmitter unit transmits the extracted stream of data bits on a basis of both the line transmission rate and the arbitrary transmission rate, for generating an electrical digital signal characterized by the arbitrary transmission rate.

Advantageously, the synchronizer/desynchronizer as described above renders the data network substantially bit-rate and data format independent, whether the data network is synchronous or asynchronous, electrical or optical. Thus, an electrical digital signal of arbitrary transmission rate, where this arbitrary transmission rate does not fall within the range of allowable transmission rates for the data network, may be transparently transported over the data network.

The present invention is further directed to a method for transmitting a digital signal of arbitrary transmission rate over a data network characterized by a range of allowable transmission rates.

BRIEF DESCRIPTION OF THE DRAWINGS

These and other features of the present invention will become apparent from the following detailed description considered in connection with the accompanying drawings. It is to be understood, however, that the drawings are provided for purposes of illustration only and not as a definition of the boundaries of the invention, for which reference should be made to the appending claims.

DETAILED DESCRIPTION

Figure 1:
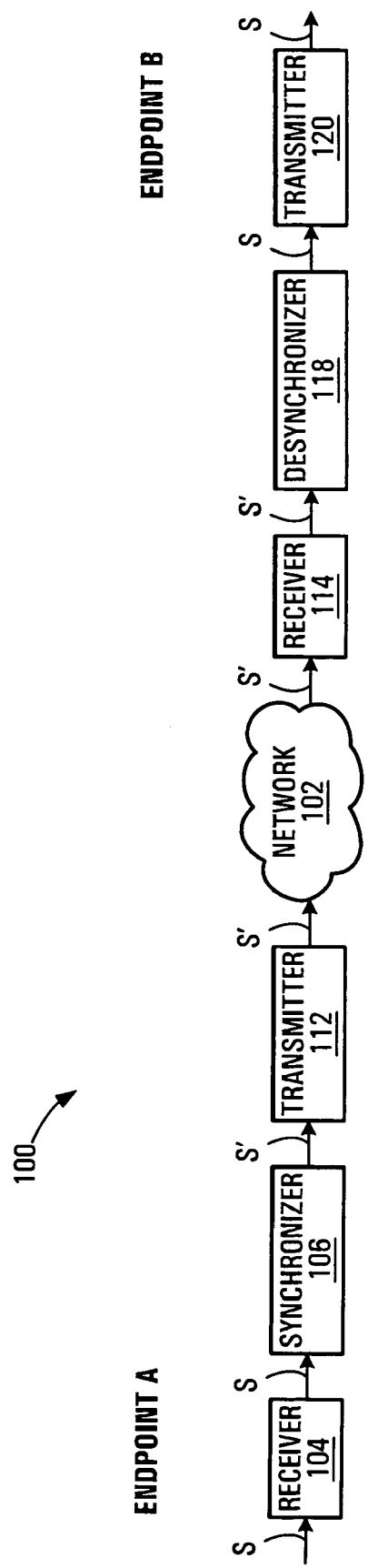
FIG. 1 is a block diagram of a communication network with the mapping system according to an embodiment of the present invention.

FIG. 1 illustrates a transmission system 100 in which data signals are transparently transported over an asynchronous data network 102, in accordance with a non-limiting example of implementation of the present invention. Only one direction of transmission, as shown by the arrows, is illustrated in this figure for purposes of clarification and simplification. The data network 102 may be optical or electrical, examples of the data network 102 including an asynchronous electrical DS3 or DS1 network, an early 622 Megabit/second asynchronous fiber network and a more recent asynchronous optical network based on OTN standards, among many other types of asynchronous data networks. Note that the use of a synchronous data network, such as a SONET/SDH network, instead of an asynchronous data network is still within the spirit of the invention. In all cases, the data network 102 is characterized by a range of allowable, discrete transmission rates.

In a specific example, the data network 102 is an asynchronous electrical DS3 network. An arbitrary electrical digital signal S is being transmitted from endpoint A to endpoint B, and is to be transported as a DS3 signal S' over the DS3 network 102. The signal S is characterized by an arbitrary transmission rate R, while the signal S' is characterized by a line transmission rate R' The term "arbitrary" implies that the signal S can carry various types of services, such as voice, data and video, among others. A receiver 104 recovers the data bits for the respective continuous digital signal S. Specific to the present invention, endpoint A is provided with a synchronizer 106 for mapping the data bits of the signal S into a DS3 signal S'.

After the signal S is mapped into the DS3 signal S', the signal S' is launched by a DS3 transmitter 112 over the electrical DS3 network 102 towards the endpoint B.

The reverse operation is performed at endpoint B. More specifically, the DS3 receiver 114 recovers the data in signal S' and presents this data to a desynchronizer 118. The desynchronizer 118 re-arranges the recovered data bits according to the respective format associated with the signal S and transmits these bits with the appropriate arbitrary transmission rate R to a transmitter 120. The transmitter 120 launches the recovered signal S over an associated network or to a local client.

Figure 2:
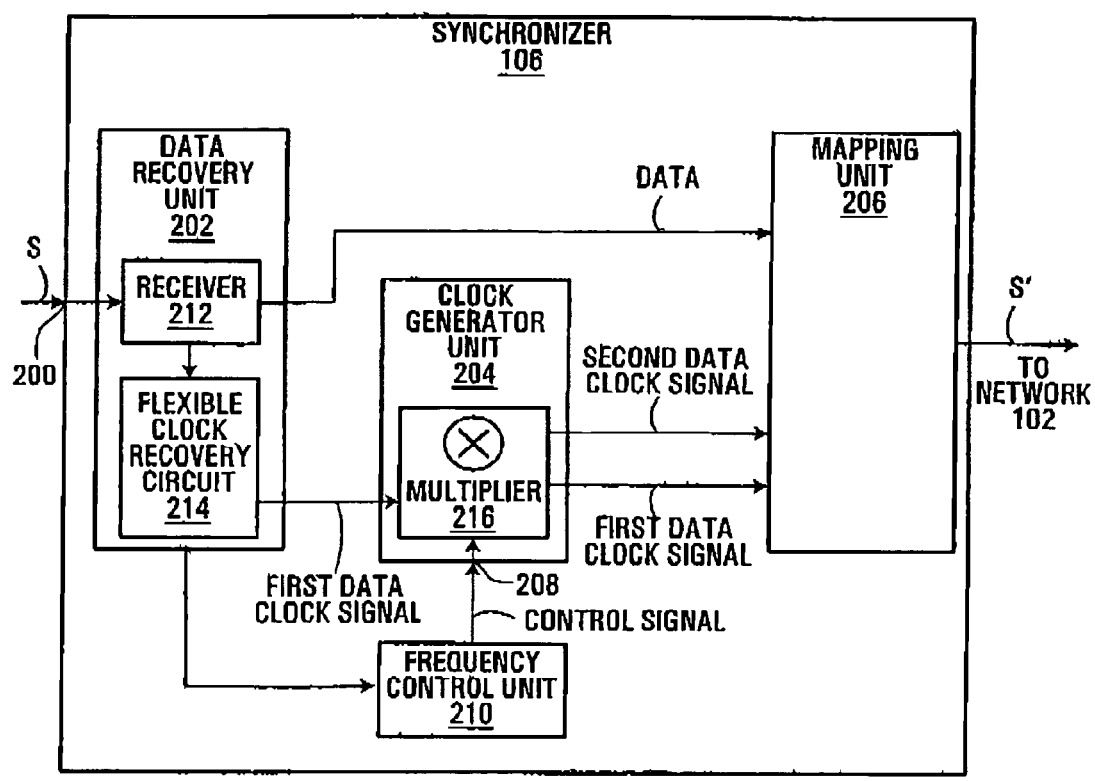
FIG. 2 is a functional block diagram of a synchronizer as shown in FIG. 1.

FIG. 2 is a functional block diagram of the synchronizer 106 that receives an electrical digital signal S at input 200. The synchronizer 106 comprises a data recovery unit 202 that is operative to extract from the signal S a stream of data bits and a data clock signal, hereinafter referred to as the first data clock signal. This first data clock signal is indicative of the arbitrary transmission rate R for the signal S. As shown in FIG. 2, the data recovery unit 202 includes a receiver 212 and a flexible clock recovery circuit 214. The flexible clock recovery circuit 214 is capable of clock recovery over a broad continuous range of bit-rates. An example of such a circuit is disclosed in the Canadian patent application filed on Nov. 10, 1999 and published on Jun. 22, 2000, entitled "Apparatus and Method for Versatile Digital Communication", by Habel et al., assigned to Northern Telecom Limited.

The data recovery unit 202 passes the extracted first data clock signal to a clock generator unit 204. The clock generator 204 processes the first data clock signal received from the data recovery unit 202 for generating a new data clock signal indicative of a line transmission rate that falls within the range of allowable transmission rates for the electrical DS3 network 102, as will be discussed in further detail below. The new data clock signal generated by the clock generator unit 204 is hereinafter referred to as the second data clock signal.

In a specific, non-limiting example of implementation, the clock generator unit 204 includes a multiplier 216 that implements frequency multiplication for generating the second data clock signal, and an input 208 for receiving a control signal. In particular, the multiplier 216 is operative to multiply the first data clock signal up to a second data clock signal that is indicative of a line transmission rate that falls within the range of allowable transmission rates for of the network 102. The control signal received at input 208 is generated by a frequency control unit 210 that automatically controls the multiplier 216.

The automatic frequency control unit 210 is operative to detect the incoming arbitrary transmission rate for the signal and to automatically set the multiplier 216 such that an appropriate frequency multiplication is applied to the first data clock signal for increasing the latter to the second data clock signal. The automatic frequency control unit 210 sets the multiplier 216 on the basis of a pre-defined and desired line transmission rate, whereby, after multiplication, the second data clock signal is indicative of this predefined line transmission rate. In an alternative, the frequency control unit 210 is itself controlled by a system operator and receives provisioning information, such as a desired line transmission rate, from the system operator. The well documented concept of frequency multiplication is well known to those skilled in the art and, as such, will not be described in further detail.

The second data clock signal is passed from the clock generator unit 204 to a mapping unit 206. The mapping unit 206 is responsible for mapping the stream of data bits into a DS3 frame for transmission over the asynchronous electrical DS3 network 102, on a basis of the second data clock signal. Thus, the mapping algorithm is independent of the format and bit rate of the network 102 in the sense that the line transmission rate is recovered from the first data clock signal of the incoming digital signal S, since the clock generator 204 processes the first data clock signal to generate the second data clock signal. This is contrary to existing mapping systems in which the line transmission rate is recovered from a local clock reference of the network 102.

Figure 3:
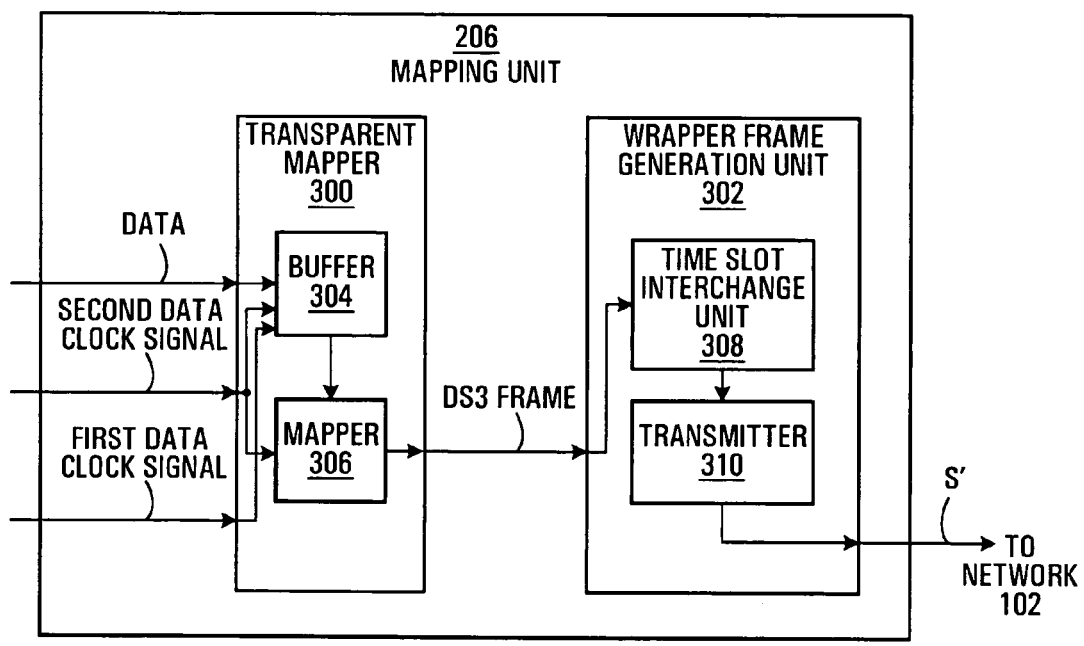
FIG. 3 is a functional block diagram of the mapping unit shown in FIG. 2.

As shown in FIG. 3, the mapping unit 206 includes a transparent mapper 300 and a wrapper frame generation unit 302. The transparent mapper 300 receives as inputs the stream of data bits and the first data clock signal extracted from the electrical digital signal S by the data recovery unit 202, as well as the second data clock signal generated by the clock generator unit 204. The transparent mapper 300 is operative to map the extracted data bits into a DS3 frame, while the wrapper frame generation unit 302 is coupled to the transparent mapper 300 for generating a wrapped DS3 frame for transmission over the DS3 network 102, as will be discussed in further detail below.

In a specific, non-limiting example of implementation, the transparent mapper 300 maps the stream of data bits extracted from the electrical digital signal S into a DS3 frame with evenly interspersed fixed stuff bits and adaptive stuff bits, where the implemented mapping algorithm is in effect a stuffing algorithm. The transparent wrapper 300 divides the DS3 frame into evenly sized blocks, and determines the number of fixed stuff bits for each block. Since the rate R of the signal S is not known in advance, the number of variable stuff bits is determined on the go, based on a function β which gives information about the phase difference between the arbitrary transmission rate R of the signal S and the line transmission rate that is generated by the clock generator unit 204.

The transparent mapper 300 comprises a flexible buffer 304 and a mapper 306. The buffer 304 generates β during processing of the current block of the DS3 frame, and this β is used for mapping of the next block. The value of β gives the position of the variable stuff bits and the number of the valid bits in the next block of the DS3 frame. Buffer 304 receives the bits of a block at the recovered first data clock signal and transmits the bits to the mapper 306 at the rate of a gapped clock. The gapped clock is derived from the second data clock signal generated by the clock generator unit 204 and is discontinued at appropriate phase instances. The discontinuities (gaps) are given by β and by the number of fixed stuff bits.

The value of β may change between adjacent blocks, as not all blocks have the same number of adaptive stuff bits, but β remains constant within each block.

The stuffing algorithm also defines the binary bit reversal of β, which is denoted α. That is, the most significant bit of β becomes the least significant bit of α; similarly the least significant bit of α becomes the most significant bit of β.

α is also determined on a per block basis, and as in the case of β, the value of α may change between the adjacent blocks but does not change within a block.

The adaptive algorithm also defines a counter C and a value D. C is the counter of bits in a block, and is represented by a 10 bit binary number. The counter C increments from 1 to 1023 and, as such, identifies the timeslot occupied by a bit in the block.

D is the bit-wise transition delta of C and is represented by a 10 bit binary number with exactly one bit set. This set bit is in the position of a 0 to 1 transition that occurs when counter C advances with one bit. Using Boolean functions, each bit of D is given by the bits of range n and n−1 of counter C, according to the equation:

$$D_n = C_n \text{ AND NOT } (C-1)_n$$

In order to spread stuff bits more or less evenly among valid data in the block, the stuffing algorithm uses the following relationship:

Valid (C, β), if any bit of $(\alpha_{1,2\ldots n} \text{ AND } D_{1,2\ldots n})$ is non zero where the mapper 306 defines a valid location, which is a location for a data bit, and an invalid location, which is a location for a stuff bit. On the basis of the valid and invalid locations of the stuffing algorithm, the mapper 306 provides an output signal, with the stuff bits (fixed and variable) distributed uniformly among the extracted data bits within a DS3 frame, to the wrapper frame generation unit 302.

For more information on the stuffing algorithm, the user can refer to the U.S. patent application Ser. No. 09/348,087 by Kim B. Roberts, filed on Jul. 8$^{th}$ 1999 and assigned to Nortel Networks Corporation. The contents of this application are incorporated herein by reference.

The wrapper frame generation unit 302 is responsible for generating a wrapped DS3 frame for transmission over the electrical DS3 network 102. In particular, DS3 overhead information is placed into the appropriate fixed stuff bit positions. A time slot interchange unit 308 re-arranges the overhead bits in the frame so that the DS3 equipment in the network 102 can recognize the DS3 frame, thus "wrapping" the DS3 frame. The wrapped DS3 frame is then transmitted towards the endpoint B over the network 102, via transmit equipment 310.

It is not deemed necessary to discuss the standard operation of the wrapper frame generation unit 302, including the addition of overhead information to the frame, in more detail because it is well known to those skilled in the art.

Figure 4:
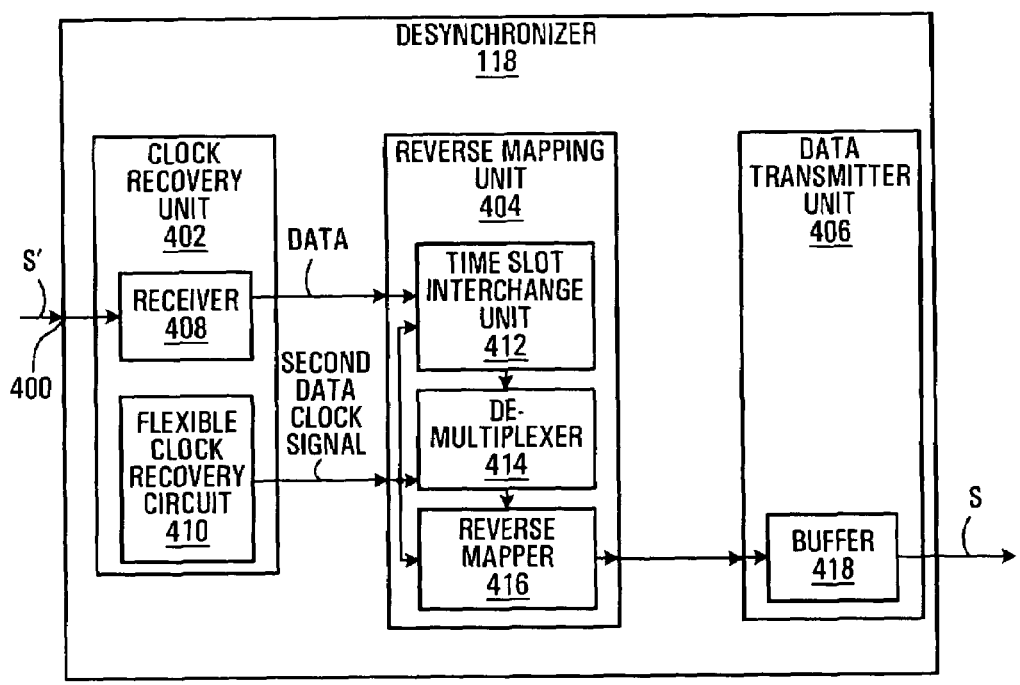
FIG. 4 is a functional block diagram of a desynchronizer as shown in FIG. 2.

FIG. 4 is a functional block diagram of a desynchronizer 118 that performs the reverse operation to that performed by the synchronizer 106, in a very similar manner, and is provided with similar functional blocks. In particular, the desynchronizer 118 receives a wrapped DS3 frame over the DS3 network 102 at input 400 and includes a clock recovery unit 402, a reverse mapping unit 404 and a data transmitter unit 406.

The clock recovery unit 402 includes receive equipment 408 operative to recover from the wrapped DS3 frame a stream of data bits in electrical format, as well as circuitry 410 for recovering from the wrapped DS3 frame a data clock signal indicative of the line transmission rate. In a specific example, a flexible clock recovery circuit 410, similar to the circuit 214 described above, is capable of clock recovery over a broad continuous range of bit-rates.

The data clock signal indicative of the line transmission rate and the stream of data bits, including stuff bits, are input to a reverse mapping unit 404. The reverse mapping unit 404 includes a time slot interchange unit 412 and a demultiplexer 414 for extracting Optical Channel Overhead (OCO) and Forward Error Correction (FEC) information from the corresponding timeslots on a basis of the recovered data clock signal indicative of the line transmission rate. The reverse mapping unit 404 further includes a reverse mapper 416 for reverse mapping the stream of data bits extracted from the wrapped DS3 frame, on a basis of the particular mapping algorithm implemented at the synchronizer 106.

In accordance with the non-limiting specific example of implementation given above for the mapping unit 206, the reverse mapper 416 reversibly maps the stream of data bits based on P and the recovered data clock signal indicative of the line transmission rate. The reversibly mapped stream of data bits is passed to a data transmitter unit 406.

The data transmitter unit 406 includes a buffer 418 for receiving the stream of data bits at the rate of a gapped clock, derived from the recovered data clock signal indicative of the line transmission rate. The data transmitter unit 406 extracts the stream of data bits from the buffer 418 at the arbitrary transmission rate, and transmits the generated electrical digital signal S characterized by the arbitrary transmission rate to a local client.

Depending on user specifications, conversion unit for converting the recovered signal S may also be provided at the endpoint B. For example, if the user is an optical access network, recovered signal S will be converted to an optical format.

Note that β, which is determined at the synchronizer 106 at endpoint A during the mapping operation, is communicated to the desynchronizer 118 at endpoint B for the reverse mapping operation, along with the data clock signal indicative of the arbitrary transmission rate for the signal S. More specifically, β and the data clock signal indicative of the arbitrary transmission rate of the signal S are encoded into the overhead information of the signal S1 for transmission from the synchronizer 106 to the desynchronizer 118.

The synchronizer 106 and the desynchronizer 118 discussed above can be implemented in hardware or in software. A software implementation requires a computing platform executing a program element. The computing platform includes a Central Processing Unit (CPU) that is coupled to a memory over a data bus. The memory holds the individual program entities that implement the various functional units of the synchronizer 106 or of the desynchronizer 118 and also data on which the program entities operate. The computing apparatus communicates with the external world through an Input/Output (I/O) hardware interface that connects with the data bus.

Note that in an alternative example of implementation, the above-described mapping system is used to transport a DS3 electrical signal S over a higher rate optical network 102. In this example, the transparent mapper 300 of the synchronizer 106 maps the signal S into a 2.5 Gigabit/second frame. The frame wrapper generation unit 302 of the synchronizer 106 adds Optical Channel Overhead (OCO) and Forward Error Correction (FEC) information to the frame, thus generating a wrapped frame S' for transmission over the optical network 102.

The above description of a preferred embodiment under the present invention should not be read in a limitative manner as refinements and variations are possible without departing from the spirit of the invention. The scope of the invention is defined in the appended claims and their equivalents.

I claim:

1. A synchronizer for mapping an electrical digital signal of arbitrary transmission rate for transport over a network characterized by a set of allowable transmission rates, said arbitrary transmission rate not being restricted to said set of allowable transmission rates, said synchronizer comprising:
    a) an input for receiving the electrical digital signal;
    b) a data recovery unit coupled to said input, said data recovery unit operative to recover from the electrical digital signal a stream of data bits and a first data clock signal indicative of the arbitrary transmission rate;
    c) a clock generator unit coupled to said data recovery unit, said clock generator including a first input for receiving the first data clock signal and a second input for receiving a control signal, said clock generator unit being operative to multiply a frequency of the first data clock signal by a value indicated by the control signal for generating a second data clock signal, the second data clock signal being indicative of a line transmission rate that falls within the set of allowable transmission rates for the network;
    d) a mapping unit in communication with said dock generator unit for receiving the second data clock signal, said mapping unit being operative for mapping the stream of data bits into at least one frame at a line transmission rate indicated by the second data clock signal; and
    e) an output for releasing the at least one frame from said synchronizer for transmission over the network.

2. A synchronizer as defined in claim 1, wherein the network is an optical network.

3. A synchronizer as defined in claim 2, wherein the optical network is an asynchronous optical network.

4. A synchronizer as defined in claim 1, wherein the network is an electrical network.

5. A synchronizer as defined in claim 4, wherein the electrical network is an asynchronous electrical network.

6. A synchronizer as defined in claim 1, wherein the at least one frame is characterized by valid timeslots and invalid timeslots, said mapping unit being operative to distribute the bits of the stream of data bits in the valid time slots and providing stuff bits in the invalid time slots.

7. A synchronizer as defined in claim 1, wherein said dock generator unit includes a multiplier.

8. A method for transmitting an electrical digital signal of arbitrary transmission rate over a network characterized by a set of allowable transmission rates, said arbitrary transmission rate not being restricted to said set of allowable transmission rates, comprising:
    a) recovering from the electrical digital signal a stream of data bits and a first data clock signal indicative of the arbitrary transmission rate;
    b) generating a second data clock signal by multiplying a frequency of the first data clock signal by a value indicated by a control signal, whereby the second data clock signal is indicative of a line transmission rate that falls within the set of allowable transmission rates for the network;
    c) mapping the stream of data bits into at least one frame at a line transmission rate indicated by the second data clock signal;
    d) releasing an output signal containing the at least one frame.

9. A method as defined in claim 8 wherein the network is an optical network.

10. A method as defined in claim 9, wherein the optical network is an asynchronous optical network.

11. A method as defined in claim 8 wherein the network is an electrical network.

12. A method as defined in claim 11, wherein the electrical network is an asynchronous electrical network.

13. A method as defined in claim 8, wherein the at least one frame is characterized by valid timeslots and invalid timeslots, the step of mapping the stream of data bits into at least one frame including distributing the bits of the stream of data bits in the valid time slots and providing stuff bits in the invalid time slots.

14. A synchronizer for mapping an electrical digital signal of arbitrary transmission rate for transport over a network characterized by a set of allowable transmission rates, said arbitrary transmission rate not being restricted to said set of allowable transmission rates, said synchronizer comprising:
  a) input means for receiving the electrical digital signal;
  b) data recovery means coupled to said input means, said data recovery means operative to recover from the electrical digital signal a stream of data bits and a first data dock signal indicative of the arbitrary transmission rate;
  c) clock generator means coupled to said data recovery means, said dock generator means including first input means for receiving the first data clock signal and second input means for receiving a control signal, said clock generator means being operative to multiply a frequency of the first data clock signal by a value indicated by the control signal for generating a second data clock signal, whereby the second data clock signal is indicative of a line transmission rate that falls within the set of allowable transmission rates for the network;
  d) mapping means in communication with said clock generator means for receiving said second data clock signal, said mapping means being operative for mapping the stream of data bits into at least one frame at a line transmission rate indicated by the second data clock signal;
  e) output means for releasing the at least one frame from said synchronizer for transmission over the network.

* * * * *